Patented Mar. 20, 1923.

1,448,869

UNITED STATES PATENT OFFICE.

PINCUS ROTHBERG, OF SUMMIT, NEW JERSEY, AND ALBERT PARSONS SACHS, OF NEW YORK, N. Y.

VARNISH.

No Drawing.   Application filed March 23, 1921. Serial No. 454,686.

*To all whom it may concern:*

Be it known that we, PINCUS ROTHBERG and ALBERT PARSONS SACHS, citizens of the United States, residing, respectively, in the town of Summit, Union County, State of New Jersey, and in the borough of Manhattan, city of New York, county and State of New York, have invented an Improvement in Varnish, of which the following is a specification.

Our invention relates to varnishes, and the principal object of our invention is to produce an oil varnish which is of improved quality, utilizes hitherto unsuitable materials, and possesses new and advantagous properties.

By an oil varnish we refer to those compounds customarily so denoted by those familiar with varnishes. In a general way this varnish contains various gums which have been run or fused to render them soluble, have then been diluted with boiled linseed oil, and the mixture heated or boiled for from one-half of five hours at a temperature of between 450° to 500° F. This product strings and is clear and transparent, and various compounds, such as litharge, copperas, sugar of lead, etc., are generally added at this stage to confer beneficial drying properties on the finished varnish. The mixture is then cooled somewhat and thinned with turpentine, and this thinned mixture is allowed to settle and age, out of contact with the air, for from six months to two years.

In an endeavor to improve this varnish and to permit the use therein of materials which are cheaper than the gums now employed in considerable quantity, we have discovered that we may employ an aryl ester of an inorganic acid, and, in particular, that we may use triphenyl phosphate $(C_6H_5)_3PO_4$, tricresyl phosphate $(C_7H_8)_3PO_4$, trinaphthyl phosphate $(C_{10}H_7)_3PO_4$, tri-monochlorphenyl phosphat $(C_6H_4Cl)_3PO_4$, triphenyl phosphite $(C_6H_5)_3PO_3$, triphenyl borate $(C_6H_5)_3BO_4$, etc., etc. At the present time we consider triphenyl phosphate to be the most desirable of the aryl esters of the inorganic acids and for that reason we shall describe the advantages of our invention with reference to this particular ester.

In employing triphenyl phosphate with oil varnish, we may add the triphenyl phosphate to the varnish as it exists, we may substitute the triphenyl phosphate for part of the gum constituent of the varnish, or we may substitute for part or all of the gums commonly used a mixture of triphenyl phosphate and a gum ordinarily unsuited for use in varnish, such as kauri, manila, etc. The addition of the triphenyl phosphate to the varnish may be made at any stage of the process from before the running until after the period of aging. If, however, the triphenyl phosphate has been added before or during the running of the varnish the process of running is much smoother and considerably more regular, and for this reason it is probably desirable to add the triphenyl phosphate at this time.

We find that the use of triphenyl phosphate in any manner results in a much harder film which is at the same time more flexible, brighter, smoother, less inflammable, and less subject to checking or the production of minute cracks in the film. By substituting, for part of the gums now in use, triphenyl phosphate alone, we substitute a new and cheaper substance and thus widen the field of available materials and simultaneously reduce the cost of the product. By substituting for the gums now used, triphenyl phosphate and gums at present considered unsuitable for oil varnish, such as kauri or manila, we are able not only to employ a much wider variety of gums, but are also able to use gums which are considerably cheaper than those now employed, and accordingly the use of triphenyl phosphate not only increases the material available for the manufacture of oil varnish but also appreciably decreases the cost of the varnish.

In our use of the word "gums" we include all gums suitable for the purpose specified. It will be noted that in the examples of the products of our invention given above, such products do not contain compounds of cellulose, such as cellulose esters, for which reason these compounds may be designated as non-cellulose or non-cellulose-ester materials.

By the term "a complete oil varnish", as used in the specification and claims, we mean a varnish which has hitherto been considered as complete, that is, a varnish which contains all the necessary ingredients to make a varnish. In this case the addition by us of triphenyl phosphate to such "a complete oil varnish" serves to improve the quality of the varnish and to give to the same certain desirable qualities, as set forth in the specification.

As we have previously stated, we now believe triphenyl phosphate to be the aryl ester of the inorganic acids best suited to our uses, and for that reason we have described our invention and the advantages thereof with reference to this particular ester, but we also believe that similar advantages will result from the use of other aryl esters of inorganic acids and especially of other phenylic esters, and accordingly the description herein of one specific embodiment of our invention is to be regarded as illustrative only and not as in any way limiting our invention.

The present application is a continuation in part of our previously filed copending application, Serial No. 292,762, filed April 25, 1919, for varnishes.

We claim:

1. An oil varnish containing an aryl ester of an inorganic acid.
2. An oil varnish containing gum and an aryl ester of an inorganic acid.
3. An oil varnish comprising a complete oil varnish and, in addition, an aryl ester of an inorganic acid.
4. An oil varnish wherein at least part of the gum constituent is composed of an aryl ester of an inorganic acid and a gum unsuited for use in ordinary oil varnish compositions.
5. An oil varnish containing a phenylic ester of an inorganic acid.
6. An oil varnish containing gum and a phenylic ester of an inorganic acid.
7. An oil varnish comprising a complete oil varnish and, in addition, a phenylic ester of an inorganic acid.
8. An oil varnish wherein at least part of the gum constituent is composed of a phenylic ester of an inorganic acid and a gum unsuited for use in ordinary oil varnish compositions.
9. An oil varnish containing triphenyl phosphate.
10. An oil varnish containing gum and triphenyl phosphate.
11. An oil varnish comprising a complete oil varnish, and, in addition, triphenyl phosphate.
12. An oil varnish wherein at least part of the gum constituent is composed of triphenyl phosphate and a gum unsuited for use in ordinary oil varnish compositions.
13. A non-cellulose-ester oil varnish containing an aryl ester of an inorganic acid.
14. A non-cellulose-ester oil varnish containing gum and an aryl ester of an inorganic acid.
15. A non-cellulose-ester oil varnish comprising a complete oil varnish and, in addition, an aryl ester of an inorganic acid.
16. A non-cellulose-ester oil varnish wherein at least part of the gum constituent is composed of an aryl ester of an inorganic acid and a gum unsuited for use in ordinary oil varnish compositions.
17. A non-cellulose-ester oil varnish containing a phenylic ester of an inorganic acid.
18. A non-cellulose-ester oil varnish containing gum and a phenylic ester of an inorganic acid.
19. A non-cellulose-ester oil varnish comprising a complete oil varnish and, in addition, a phenylic ester of an inorganic acid.
20. A non-cellulose-ester oil varnish wherein at least part of the gum constituent is composed of a phenylic ester of an inorganic acid and a gum unsuited for use in ordinary oil varnish compositions.
21. A non-cellulose-ester oil varnish containing triphenyl phosphate.
22. A non-cellulose-ester oil varnish containing gum and triphenyl phosphate.
23. A non-cellulose-ester oil varnish comprising a complete oil varnish, and, in addition, triphenyl phosphate.
24. A non-cellulose-ester oil varnish wherein at least part of the gum constituent is composed of triphenyl phosphate and a gum unsuited for use in ordinary oil varnish compositions.

In testimony whereof, we have signed our names to this specification this 8th and 14th days of March, 1921, respectively.

PINCUS ROTHBERG.
ALBERT PARSONS SACHS.